United States Patent [19]

Lasley

[11] Patent Number: 5,004,872
[45] Date of Patent: Apr. 2, 1991

[54] DIGITIZER TABLET WITH PRESSURE STYLUS

[75] Inventor: Daniel G. Lasley, Newtown, Conn.

[73] Assignee: Summagraphics Corporation, Seymour, Conn.

[21] Appl. No.: 437,018

[22] Filed: Nov. 14, 1989

[51] Int. Cl.[5] .............................................. G08C 21/00
[52] U.S. Cl. ....................................................... 178/18
[58] Field of Search ..................................... 178/18, 19

[56] References Cited

U.S. PATENT DOCUMENTS

4,786,764 11/1988 Padula et al. .......................... 178/18
4,806,707 2/1989 Landmeier ............................. 178/18

Primary Examiner—Stafford D. Schreyer
Attorney, Agent, or Firm—Rosen, Dainow & Jacobs

[57] ABSTRACT

A digitizer tablet using a pressure-sensitive pointing device preferably containing a linear transducer is provided with the means to convert linear pressure signals to logarithmically-related output counts. The conversion means is programmable to allow outputting of a logarithmically or a linearly related count for use by an application program.

22 Claims, 4 Drawing Sheets

DIGITIZER TABLET WITH PRESSURE STYLUS

This invention relates to digitizer tablets for locating the position of a pointing device over a grid structure, and in particular to such a digitizer tablet employing a pressure-responsive pointing device.

BACKGROUND OF THE INVENTION

Digitizer tablets are well known in the art. In one popular type, the pointing device comprises a coil in a cursor or stylus configuration which is positioned by a user over a tablet surface in which is embedded a wire grid extending in two coordinate directions. In one mode, the pointing device coil is energized to electromagnetically induce signals in the grid wires. In another mode, the grid wires are energized to electromagnetically induce signals in the pointing device coil. In both modes, the grid wires are sequentially addressed, either one at a time or in groups, to provide an output analog voltage in timed relation to the grid addressing. The output voltage with increasing time reaches a maximum, passes through zero, and then reaches a minimum in the vicinity of the pointing device coil. When addressing begins, a counter is activated which keeps track of the particular grid line addressed. A stop signal for the counter is generated when the zero crossover is determined. The count value determines the location of the pointing device with respect to the two or three closest grid wires. Examples of patents describing in more detail this type of digitizer are Kamm et al U.S. Pat. No. 3,904,822; Ioanau U.S. Pat. No. 3,873,770; and Zimmer U.S. Pat. No. 4,368,351, whose contents are hereby incorporated by reference.

In a typical tablet, the stylus or cursor position is expressed as an X, Y coordinate pair, with the X and Y axes having their normal orientation from an origin at the lower, left-hand corner of the tablet. The Z axis in this coordinate system is upward from the tablet surface. For most tablets, the Z axis represents only proximity, which is the maximum distance above the tablet's active area that the cursor or stylus can be held and still report a valid position. Thus, the Z coordinate is typically represented only as one of two binary values. Another way of utilizing the Z axis is as a binary switch. In this mode, a switch (sometimes called a button) is incorporated inside the barrel of the stylus and is connected to the stylus tip. The switch is normally open and is activated by the user pressing the stylus tip against the tablet. The switch action can be used in the same manner as an outside button on the stylus or as the buttons on a cursor.

But there also exist tablets in which Z coordinate data is employed as a kind of analog switch. This is implemented by incorporating in the stylus in place of the switch a linear transducer connected to the stylus tip. In this mode, the Z axis output is now a function of the stylus tip pressure, that is, the amount of force that the user employs in pressing the stylus against the tablet surface. The advantage is that now a third variable becomes available for use by an application program to enhance the user interface. A number of application programs use this Z coordinate data to perform certain functions. For example, one line drawing or paint program uses the stylus pressure to determine paint brush or line width, with the heavier the pressure, the wider the line. Another program uses stylus pressure for zooming icons pointed to by the stylus.

As mentioned, implementation of Z coordinate data is accomplished by incorporating a linear transducer in the stylus barrel. Known linear transducers used are mechanical strain gauges, or gel pellets whose resistance changes as the gel is compressed when the user presses the stylus tip against a surface. It is desirable for the stylus to generate Z data over a reasonably wide range of stylus pressure. A typical range is from 0–6 oz of pressure. Assuming a resolution of, say, 0.02 oz, this would allow a total of 300 distinguishable Z values to be detected and used by the application program. But with a linear transducer, this would require a user to be able to control the stylus so as to apply fifty different pressures not only in the 0–1 oz range at the low end, but also in the 5–6 oz range at the high end. This imposes undue demands on user dexterity and control.

SUMMARY OF INVENTION

An object of the invention is an improved digitizer tablet with pressure stylus.

Another object of the invention is a digitizer tablet with pressure stylus that provides a large range of Z data values yet is easy to use.

A further object of the invention is a digitizer tablet with pressure stylus that is more versatile than the known tablets.

These and other object and advantages of the invention as will appear hereinafter are based on the recognition that human dexterity and feel is naturally closer to a logarithmic function than to a linear function. This is evidenced by the controlled pressure the average user can apply with a light touch, as well as the relatively high pressure that can be applied with the heaviest touch. Hence, to increase the number of resolvable pressure values over a practical stylus pressure, in accordance with the invention, the pressure range for lighter touches must be expanded and that for heavier touches compressed. One possible solution is to employ in the stylus a non-linear transducer, specifically a transducer that exhibits a logarithmic output as a function of applied pressure. However, such transducers are less common.

In accordance with a preferred embodiment of the invention, a linear transducer of the known type is employed, whose raw data output is linear with applied stylus pressure. But, that linear data is processed and converted into a logarithmic output. The result is the same as would be produced if a logarithmic transducer were employed. Moreover, this aspect of the invention has the additional advantage that the linear-to-logarithmic conversion processing can be readily enabled or disabled by the user as preferred, which makes for a more versatile tablet.

SUMMARY OF DRAWINGS

The invention will now be described with reference to the accompanying drawings wherein.

DETAILED DESCRIPTION OF PREFERRED EMBODIMENTS

Reference is made to the above-referenced patents for a more detailed description of tablet constructions and their operation. Most of the details are unnecessary for a understanding of the present invention. Thus, it is not important to the present invention how the grid wires are laid out or scanned, whether individually or in group, nor is it important how the analog voltages are amplified or associated with a particular grid wire as this is all well-known in the art. Moreover, it doesn't matter whether the grid is energized and the output taken from the pointing device coil, or vice-versa. The present description will thus generally describe how the analog output voltages are converted into digital count values which can then be processed to determine pointing device location and pressure. For this purpose, a particular tablet construction, typical of commercial units, will be assumed and the invention explained in the context of that assumed tablet, but it will be understood that the invention is not limited in its application to that assumed construction but is generally applicable to any digitizer tablet wherein analog signals are correlated to grid wire locations in the process of locating a pointing device with respect to those gride wires. Moreover, the assumed embodiment will illustrate the invention applied to determining pointing device position with respect to one coordinate of a typical X-Y coordinate system, but it will be understood that a similar grid array will exist for the other of the two coordinate axis system and the successive scanning of the second grid will generate the coordinate position for that second coordinate axis, which again is typical of known digitizer tablets. It will further be understood that, while a tablet is described that operates electromagnetically with an electrode array in the form of wires, the invention is also applicable to tablets that operate electrostatically with an electrode array, or to tablets using ultrasonics, or optics in other arrangements to determine pointing device position. All of these tablets can employ a pointing device usually in stylus form containing a linear transducer to output signals related to the applied stylus pressure.

Figure 1:
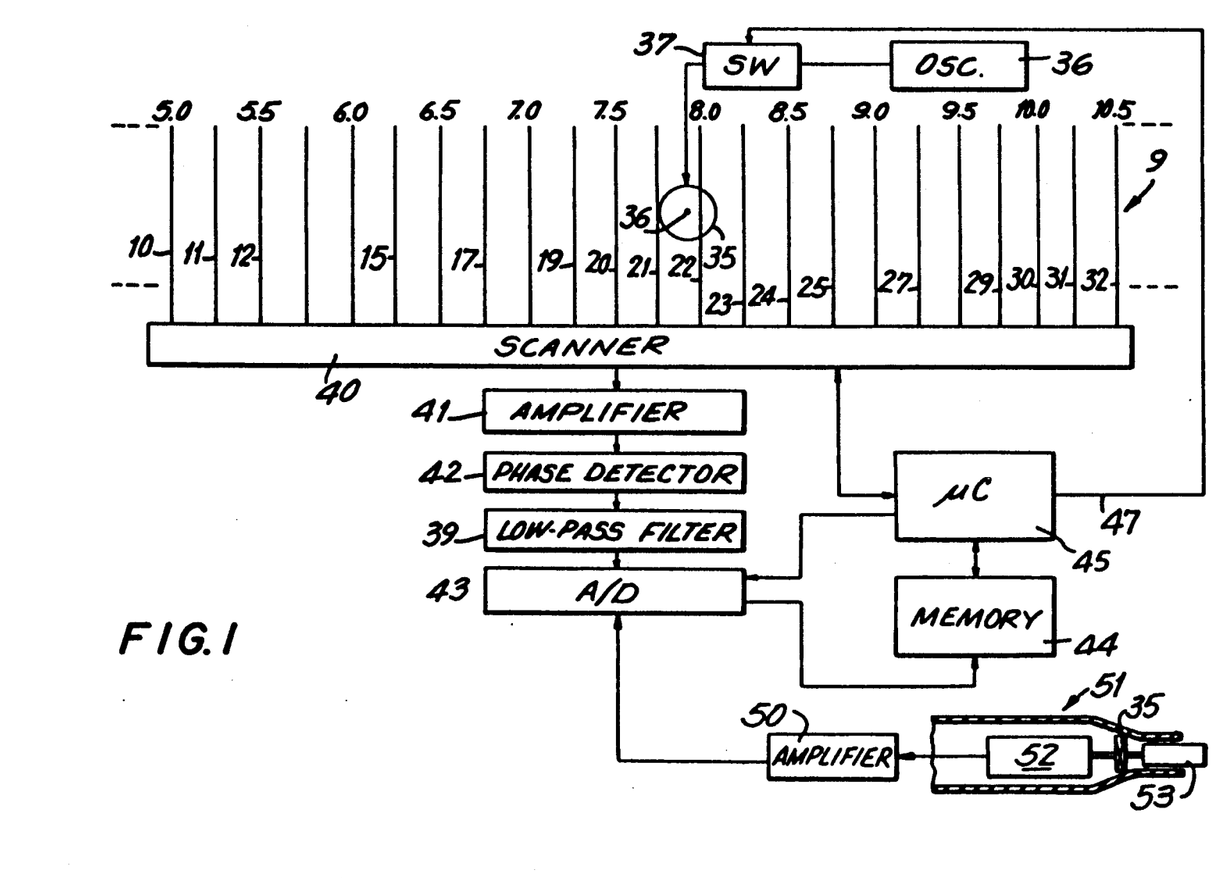
FIG. 1 is a schematic layout of the grid array for one coordinate axis of a digitizer tablet according to the invention, also showing a block diagram, of the signal processing circuitry.

FIG. 1 illustrates, schematically, the grid layout 9 of a portion of a typical tablet. The grid wires 10-32 extend in, say, the Y direction and are used to determine X-coordinate positions. The grid wire locations with respect to the origin is indicated by the series of numbers at the top of the figure. Thus, wire 10 is located 5.0 inches from the origin, wire 11 at 5.25 inches, wire 12 at 5.5 inches, and so on. A pointing device coil 35 is indicated by the circle, with its electrical center by numeral 36. The object is to locate the center 36 with respect to the grid array 9. In this exemplary embodiment, the tablet pointing device is driven by connecting the coil 35 to an oscillator 36 via a switch 37. Sequential scanning of the grid wires is carried out by a conventional scanner 40, and any voltages induced in a grid wire are amplified in a conventional amplifier 41, synchronous phase detector 42, low-pass filter 39, and then processed through a conventional A/D converter 43. The digital outputs are then stored in memory 44. All this is done under the control of a microcontroller (uC) 45.

In a typical operation, the scanner 40 connects each grid wire in turn to the amplifier 41 every, say, 100 uS. The induced voltage in that grid wire is derived, amplified, filtered, converted into a digital count and stored in successive memory locations in memory 44. The uC 45 is connected via line 47 to the switch 37 to turn the latter off during an initialization phase, so that a reference digital count can be determined without the coil 35 being energized and thus without a signal being induced in the wires. Later on during the processing, the switch 37 is turned back on.

As is well-known, the number of levels into which an analog signal can be digitized is determined by the number of binary bits allocated for the digitization process. Thus, an 8-bit A/D converter can convert the analog signal into one of 256 possible values, whereas a 10-bit A/D converter can convert into one of 1024 possible values. While the invention is not limited thereto, I prefer to use a 10-bit A/D converter 43 to increase accuracy, and the values given below are based upon the use of such a converter.

Subsequent to obtaining the stylus position information, represented by an X/Y digital count pair, the switch 37 is turned off and the stylus pressure transducer analog output, amplified by amplifier 50, is connected by the microcontroller 45 to the A/D converter 43, which again digitizes the Z axis or pressure signal and stores a count representative of the stylus pressure in memory 44. Assuming, again, a 10 bit A/D converter, and a stylus pressure range of 0-6 oz, a count value will be stored in the range of 0-1024 for the Z coordinate or pressure value. FIG. 1 also shows a schematic view of a stylus 51 containing a conventional linear transducer 52 connected to the stylus tip 53. The coil in the stylus represented by circle 35 in the electrode array above is also shown in the stylus 51. The processing of the linearly-related count stored in memory 44 depends upon the status of a second switch, in software and which can be activated by the user or by an application program, for controlling the microcontroller 45.

A feature of the invention is that, by using a linear transducer 52 in the stylus 51, the pressure signal outputted by the stylus can be linearly related to the stylus applied pressure by using the stored linearly-related count in the same manner as had been done in the prior art. If desired, the count in the range of 0-1024 can be compressed, linearly, to a more realistic range by simply dividing each value of the stored count by a constant. So, for example, if a range of 0-250 (approximately) is desired, the count value is divided by 4. Activating the logarithmic linear switch, however, will enable a linear-to-log conversion routine which will convert any linearly-related stored count to a logarithmically-related value. This can be done in one of several ways.

Figure 2:
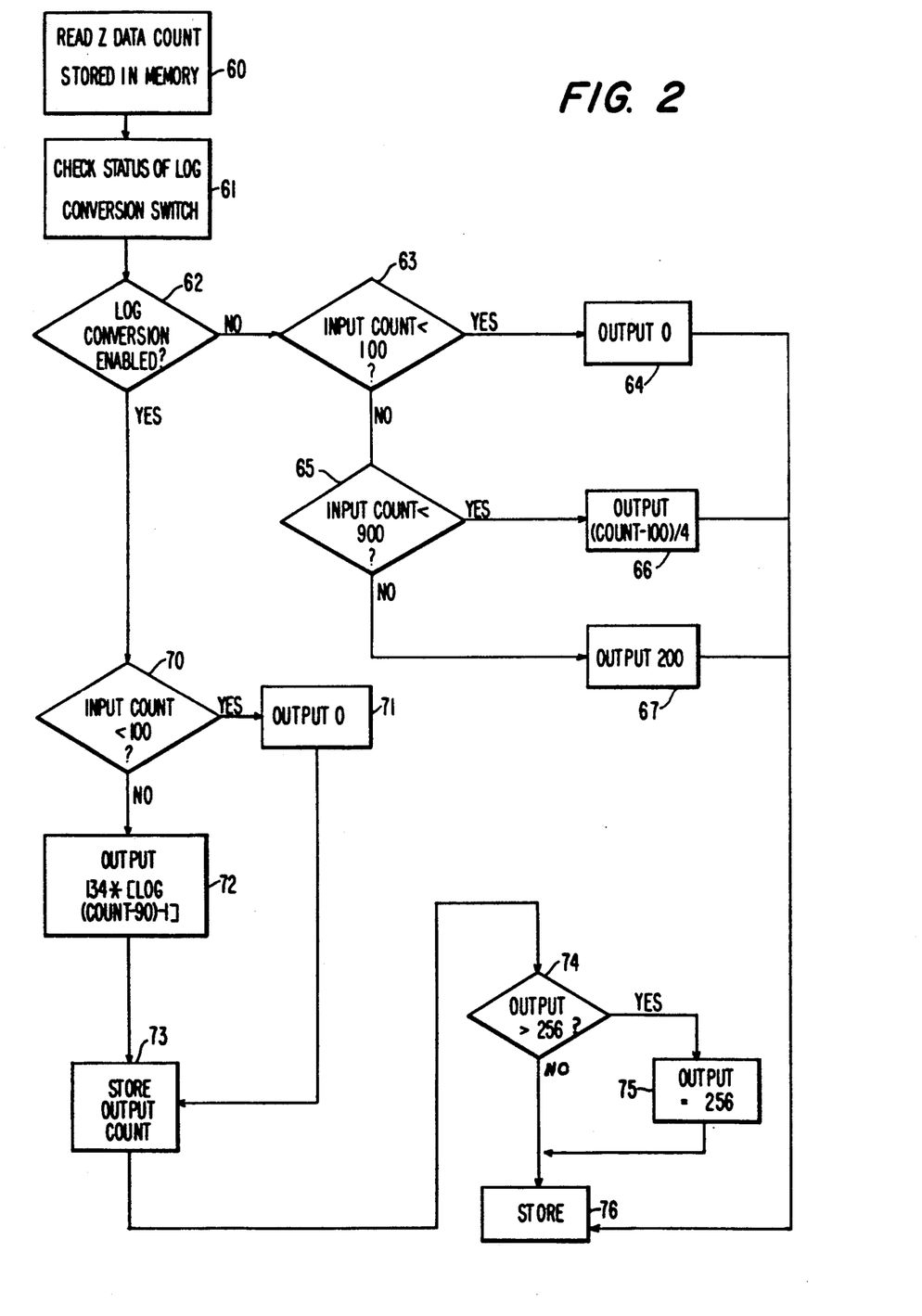
FIGS. 2 and 3 are flow charts of the processing of the Z axis pressure data in accordance with the invention to produce outputs that are either logarithmically or linearly related to the stylus tip pressure.
Figure 3:
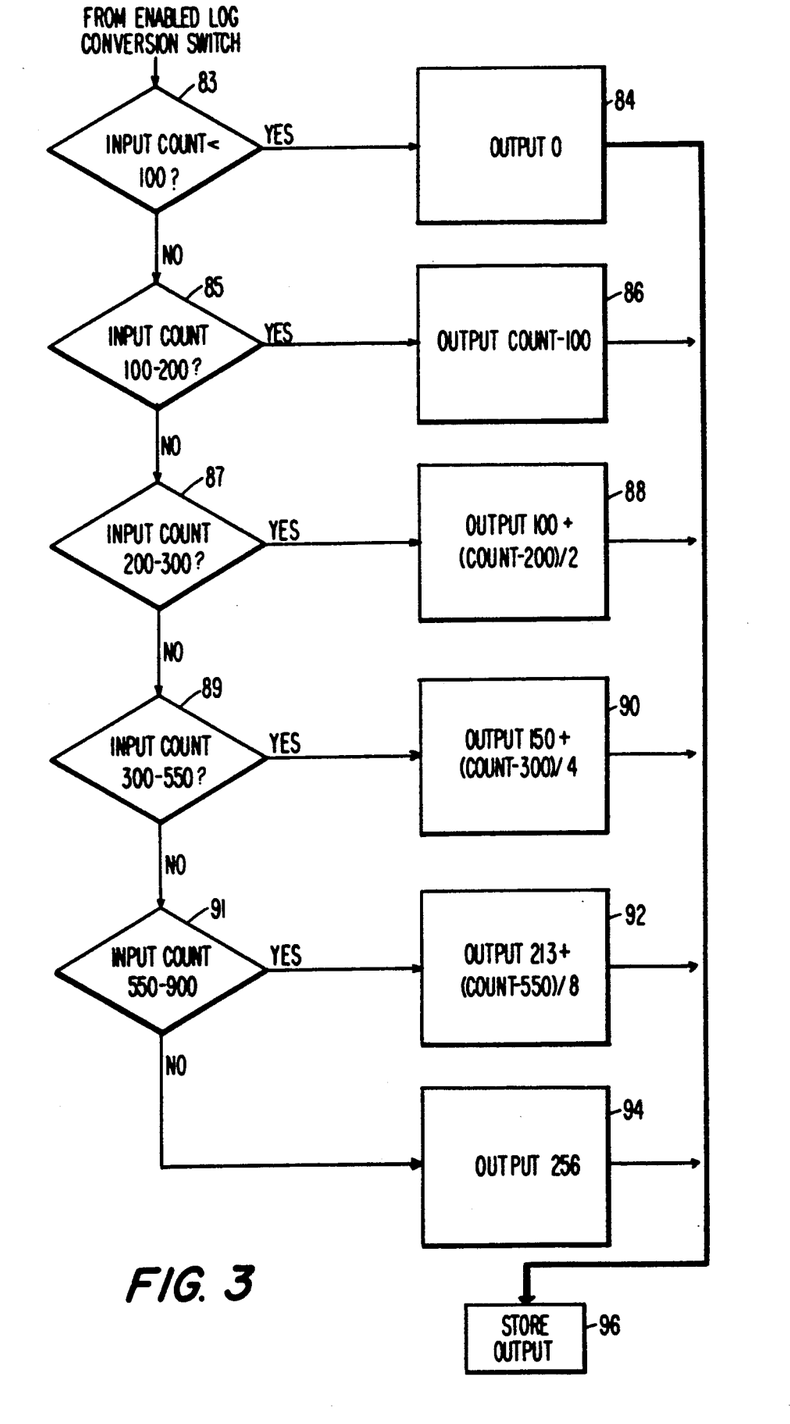

FIGS. 2 and 3 illustrate several ways of accomplishing the logarithmic conversion by a software routine callable by the microcontroller. The FIG. 2 flow chart shows the basic processing of the Z axis pressure data. In block 60, the Z data count stored in memory is read. The status of the log conversion switch is determined in block 61. As mentioned, this switch is user programmable or application programmable. If enabled (block 62), the linear-to-log routine is executed. If not, a linear compression routine is executed, starting at block 63.

In this routine, as in others described, it is preferred to throw away all count values below 100 and exceeding 900 of the preferred 0-1024 range. The desire to ignore counts in the 0-100 range is based on establishing at least a small pressure threshold that must be exceeded before the signal processor will recognize and respond to a pressure signal. Otherwise, the stylus pressure would be too sensitive, and even unintended touches of the stylus tip would be treated as real data and produce undesired actions. The reason for ignoring counts exceeding 900 is that it may be an error, and doing so does not involve a significant sacrifice in resolution, as the remaining range of 100–900 is more than adequate for current tablet environments. Put another way, buffer regions each equal to about 10% of the range have been added at the beginning and end to minimize the need for calibration of the pressure circuit.

In accordance with the foregoing, block 63 tests for a count below 100. If true, a 0 count value is outputted at 64. If the input count is greater than 100 but less than 900, tested at block 65, block 66 outputs the (count $-100$) divided by 4. This will compress the input range of 800 counts to 200. If the count exceeds 900, a 200 count value is outputted at block 67. The outputted counts are stored (block 68) in the memory 44, where it can be accessed by the application program and used for any purpose desired.

When the log conversion switch is enabled, as before, at block 70 if the input count is less than 100, a 0 value is outputted at block 71. If not, the routine outputs at block 72 a value calculated by the following formula:

$$134 * [\log(\text{count}-90)-19.$$

In this formula, count is the original digital count obtained from the transducer, and log is to the base 10. The value is stored at block 73. If the stored count is greater than 256, tested at block 74, 256 is outputted at block 75. The final output of both routines is stored at block 76.

Figure 4:
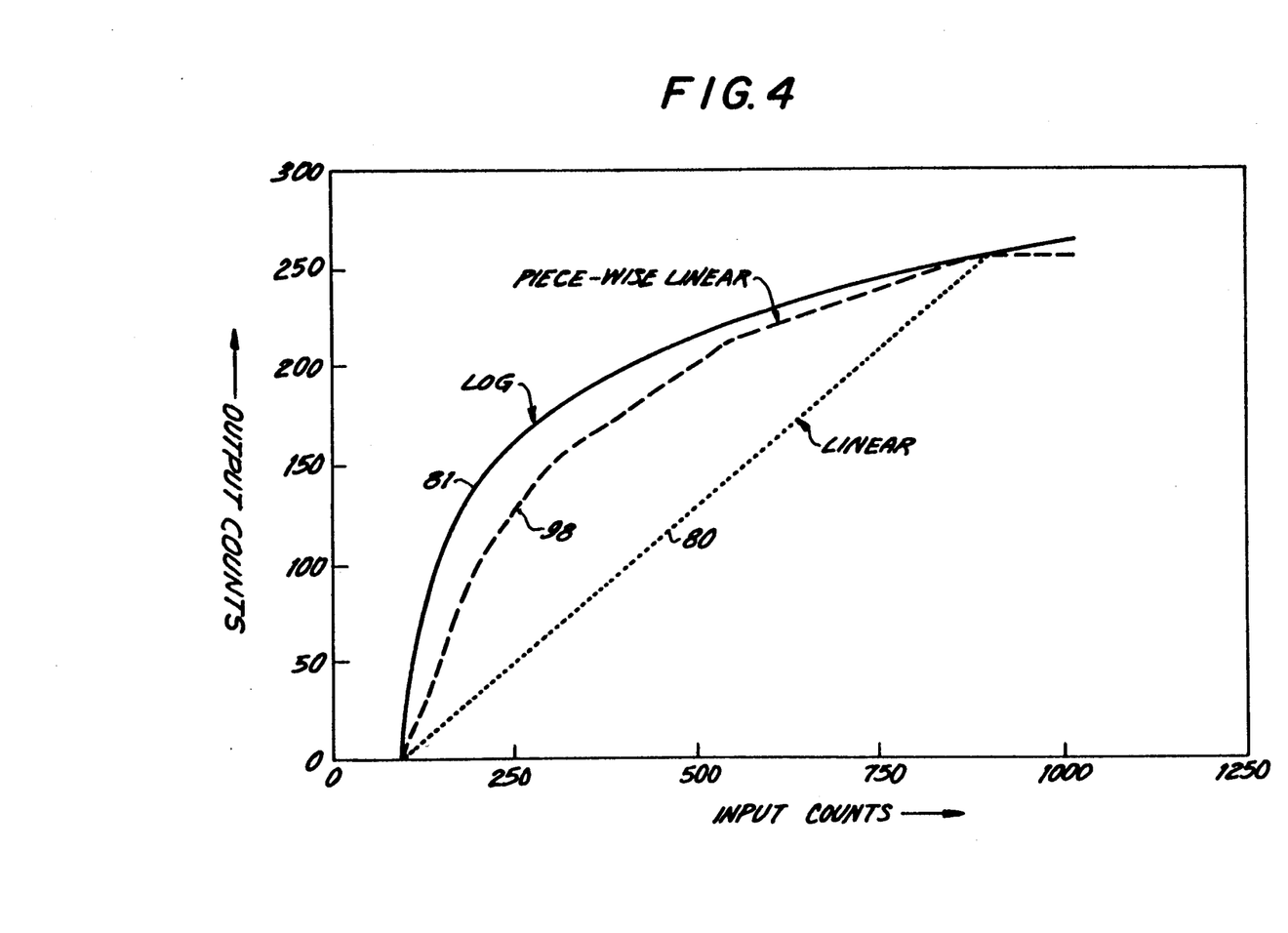
FIG. 4 is a graph showing various functional relationships between an input count representing stylus pressure and an output count after processing in accordance with the invention.

The stored output is shown in FIG. 4, which is a graph of 3 curves relating the input count before the processing of FIG. 2 to the output count stored at block 76. In FIG. 4, the curve 80 labelled "LINEAR" represents the output count (input/4) processed normally, i.e., compressed linearly with the beginning and end 10% thrown away. The second curve 81 labelled "LOG" is the output in accordance with the formula calculated above. As will be observed, the output is expanded over the low pressure range and compressed over the high pressure range, which is more in conformance with normal human hand dexterity and control. Hence, to the user, it will seem as if the stylus is responding to normal increases in pressure in a proportional manner greatly enhancing user control of the pressure stylus.

FIG. 3 shows another routine for producing a piece-wise linear approximation of a log transfer function. It has two limitations: (1) the maximum slope is 1:1, and (2) there are four different slopes between the margins. Thus, for the input count sub-ranges listed below in the table, the outputs counts are calculated as follows:

| INPUT COUNT | OUTPUT COUNT |
| --- | --- |
| 0–100 | 0 |
| 100–200 | (Input Count - 100) |
| 200–300 | 100 + (Input Count - 200)/2 |
| 300–550 | 150 + (Input Count - 300)/4 |
| 550–900 | 213 + (Input Count - 550)/8 |
| 900–1024 | 256 |

The routine to accomplish the foregoing is illustrated in FIG. 3. This routine would be executed when the log conversion test represented by block 62 in FIG. 2 indicates the log conversion switch has been enabled. Thus, block 83 tests for 0–100 input counts. If YES, 0 is output at block 84. If the input count tested at block 85 is in the sub-range of 100–200, then the output is the input count $-100$ from block 86. If the input count tested at block 87 is 200–300, block 88 outputs 100+(Count$-$200)/2. If the input count tested at block 89 is 300–500, then block 90 outputs 150+(Count$-$300)/4. If the input count tested at block 91 is 550–900, block 92 outputs 213+(Count$-$500)/8 If the input count tested at block 91 is greater than 900, block 94 outputs 256. The count output is stored at block 96 and can be used by the application program.

The result output curve is illustrated in FIG. 4 at 98 and labelled 37 PIECE-WISE LINEAR". As will be observed, the curve 98 reasonably approximates the log curve 81. It will be appreciated that the resultant output is only an approximation of an exact logarithmic conversion. Nevertheless, either curve 81 or 98 approximates much more closely the natural hand dexterity and control of a human user and thus represents a significant improvement in the human-tablet interface. It will be further understood that, while the described linear-to-log conversion routines are preferred, the invention is not limited thereto and other mathematical ways exist for effecting the desired conversion. Moreover, the invention is not limited to a software conversion process. Obviously, the conversion can be accomplished in hardware, and it is intended that such hardware linear-to-log conversions are also within the scope of my invention.

Also, from the description given, it will be noted that approximately 200–250 pressure level outputs are achieved. If an 8-bit A/D converter were employed, the output would have approximately 50 levels if the same code were executed. This may be sufficient for most users, and is also considered within the scope of my invention.

It will further be observed that the linear-to-log conversion in the preferred embodiments occurs after the A/D converter has converted the analog pressure signal into a digital count. While this processing is preferred, the invention is not limited thereto, and the conversion can take place while the pressure signal is still analog, that is, before the A/D processing. However, this implementation would probably be somewhat more expensive than the preferred versions described and implemented.

Thus, the invention provides a way to maintain the sensitivity at lower stylus tip pressures and decrease the sensitivity at higher stylus tip pressures in order to reduce overall the tip pressure required to utilize the full output range. This provides a tablet construction with a pressure stylus whose operation more closely conforms to the user's abilities. By employing a linear pressure transducer in the stylus, costs are reduced, and the added advantage is obtained that through software commands the linear-to-log conversion can be enabled or disabled to provide either a logarithmically related Z axis output or a linearly related Z axis output.

While the invention has been described and illustrated in connection with preferred embodiments, many variations and modifications as will be evident to those skilled in this art may be made therein without departing from the spirit of the invention, and the invention as set forth in the appended claims is thus not to be limited to the precise details of construction set forth above as such variations and modifications are intended to be included within the scope of the appended claims.

What is claimed is:

1. In a digitizer tablet comprising an electrode array, a pointing device whose position is to be located with respect to the array and whose applied pressure is to be determined with respect to the tablet, and means for energizing the array and tablet to generate position and pressure signals representative, respectively, of the pointing device position and pressure, said pointing device having a linear transducer for converting applied pointing device pressure into electrical signals linearly related to the applied pressure, the improvement comprising:
   (a) means for processing the transducer electrical signals to convert their linear relation to pointing device pressure to a substantially logarithmic relation.

2. The digitizer tablet of claim 1, further comprising:
   (b) means for storing the logarithmically converted transducer signals.

3. In a digitizer tablet comprising an electrode array, a pointing device whose position is to be located with respect to the array and whose applied pressure is to be determined with respect to the tablet, and means for energizing the array and tablet to generate position and pressure signals representative, respectively, of the pointing device position and pressure, said pointing device having a linear transducer for converting applied pointing device pressure into electrical signals linearly related to the applied pressure, the improvement comprising:
   (a) means for digitizing the transducer electrical signals,
   (b) means for processing the digitized transducer signal value to convert their linear relation to applied pointing device pressure to a logarithmic relation,
   (c) means for storing the logarithmically converted digitized transducer signals.

4. The digitizer tablet as claimed in claim 3, wherein the digitizing means comprises means for generating a count linearly related to the pointing device pressure, and the conversion processing means comprises means for converting the linearly related count to a logarithmically related count.

5. The digitizer tablet as claimed in claim 4, wherein the conversion processing means include means for dividing the linearly related count range into a plurality of sub-ranges which increase in range value from low to high count values.

6. The digitizer tablet as claimed in claim 5, wherein the logarithmically related count outputted for each sub-range is calculated by a different formula.

7. The digitizer tablet of claim 6, wherein the logarithmically related count outputted for the lowest sub-range is zero.

8. The digitizer tablet as claimed in claim 4, wherein the conversion processing means comprises means for multiplying the log of linearly related count by a constant.

9. The digitizer tablet as claimed in claim 3, further comprising means for enabling and disabling the logarithmically related conversion means.

10. In a digitizer tablet comprising an electrode array, a pointing device whose position is to be located with respect to the array and whose applied pressure is to be determined with respect to the tablet, and means for energizing the array and tablet to generate position and pressure signals representative, respectively, of the pointing device position and pressure, said pointing device having a linear transducer for converting applied pointing device pressure into electrical signals linearly related to the applied pressure, the improvement comprising:
   (a) means for digitizing the transducer electrical signals,
   (b) means for processing the digitized transducer signal values, to convert their linear relation to a substantially logarithmic relation,
   (c) means for enabling and disabling the logarithmic conversion processing means to output a logarithmically related value when enabled and a linearly related value when disabled.

11. The digitizer tablet of claim 10, wherein the enabling and disabling means is programmable.

12. A method for operating a digitizer tablet having a pointing device containing a transducer for converting pointing device pressure into an electrical signal, comprising the steps:
   (a) converting the transducer signal into a count logarithmically related to the pointing device pressure,
   (b) storing the logarithmically related count.

13. A method for operating a digitizer tablet having a pointing device containing a linear transducer for converting pointing device pressure into an output signal linearly related to the applied pointing device pressure, comprising the steps:
   (a) providing means for converting the transducer output signal to a count linearly related to the pressure,
   (b) providing processing means for converting the linearly related count to a logarithmically-related count, said means being capable of being enabled and disabled,
   (c) enabling the processing means of step(b) to obtain a logarithmically related count,
   (d) disabling the processing means of step(b) to obtain a linearly related count.

14. The method of claim 13, further comprising the step:
   (e) storing the count obtained in step (c) or step (d).

15. A method for operating a digitizer tablet having a pointing device containing a linear transducer for converting pointing device pressure into an output signal linearly related to the applied pointing device pressure, comprising the steps:
   (a) converting the linearly related output signal to a logarithmically-related count,
   (b) storing the count obtained in step(a).

16. The method for operating a digitizer tablet as claimed in claim 15 wherein step(a) comprises the steps of:
   (c) converting the output signal into a count value and providing means to establish a sequence of sub-ranges of count values varying from low to high sub-ranges,
   (d) determining into which sub-range the count of step (c) falls,
   (e) processing the count of step(c) in accordance with the determined sub-range of step(d), the processing being different for each sub-range to produce an output which is logarithmically related to the count of step(c), said output increasing in smaller increments as the sub-ranges increases from low to high values.

17. The method of claim 16, wherein the outputs of the beginning and end sub-ranges are discarded.

18. The method of claim 17 wherein a 10-bit A/D converter is provided, and the steps (c), (d) and (e) are carried out in accordance with the following table:

| INPUT COUNT SUB-RANGES | OUTPUT COUNT |
| --- | --- |
| 0–100 | 0 |
| 100–200 | (Count - 100) |
| 200–300 | 100 + (Count - 200)/2 |
| 300–550 | 150 + (Count - 300)/4 |
| 550–900 | 213 + (Count - 550)/8 |
| 900–1024 | 256 |

19. The method of claim 15, wherein step (a) is carried out by converting the transducer signal to a count value, and multiplying the log of the count value by a constant.

20. The method of claim 15, further comprising the step of disabling the converting step to output a linearly related signal.

21. In a digitizer tablet comprising an electrode array, a pointing device whose position is to be located with respect to the array and whose applied pressure is to be determined with respect to the tablet, and means for energizing the array and tablet to generate position and pressure signals representative, respectively, of the pointing device position and pressure, the improvement comprising:

(a) means in the tablet for receiving and converting the pressure signals generated by the pointing device into output data values which are substantially logarithmically related to the applied pointing device pressure.

22. The digitizer tablet of claim 21, further comprising means for selectively outputting from the tablet linear or logarithmically related signals.

* * * * *

UNITED STATES PATENT AND TRADEMARK OFFICE
CERTIFICATE OF CORRECTION

PATENT NO. : 5,004,872

DATED : April 2, 1991

INVENTOR(S) : Daniel G. Lasley

It is certified that error appears in the above-identified patent and that said Letters Patent is hereby corrected as shown below:

Column 5, line 27, in the formula, change "-19" to -- -1 --.

Column 6, line 16, omit "37".

Signed and Sealed this

Ninth Day of February, 1993

*Attest:*

STEPHEN G. KUNIN

*Attesting Officer*     *Acting Commissioner of Patents and Trademarks*